March 8, 1966 B. S. POWELL 3,239,052
UNLOADING MECHANISM FOR MULTI-DECK CONVEYOR APPARATUS
Filed Jan. 17, 1964 9 Sheets-Sheet 1

INVENTOR
BERTIS S. POWELL
BY Shoemaker and Mattare
ATTORNEYS

March 8, 1966  B. S. POWELL  3,239,052
UNLOADING MECHANISM FOR MULTI-DECK CONVEYOR APPARATUS
Filed Jan. 17, 1964  9 Sheets-Sheet 2

FIG. 2

INVENTOR
BERTIS S. POWELL

BY *Shoemaker and Mattare*

ATTORNEYS

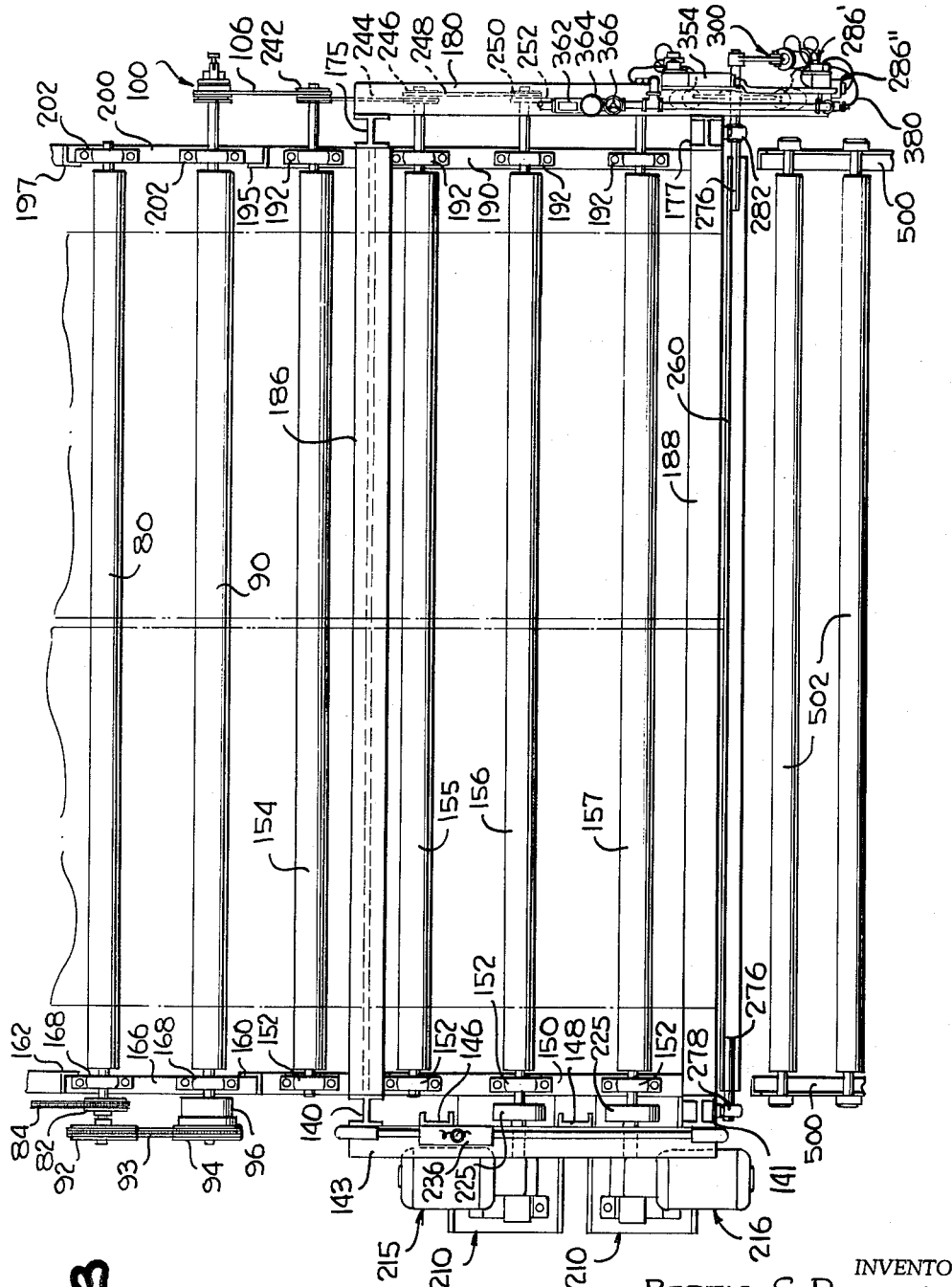

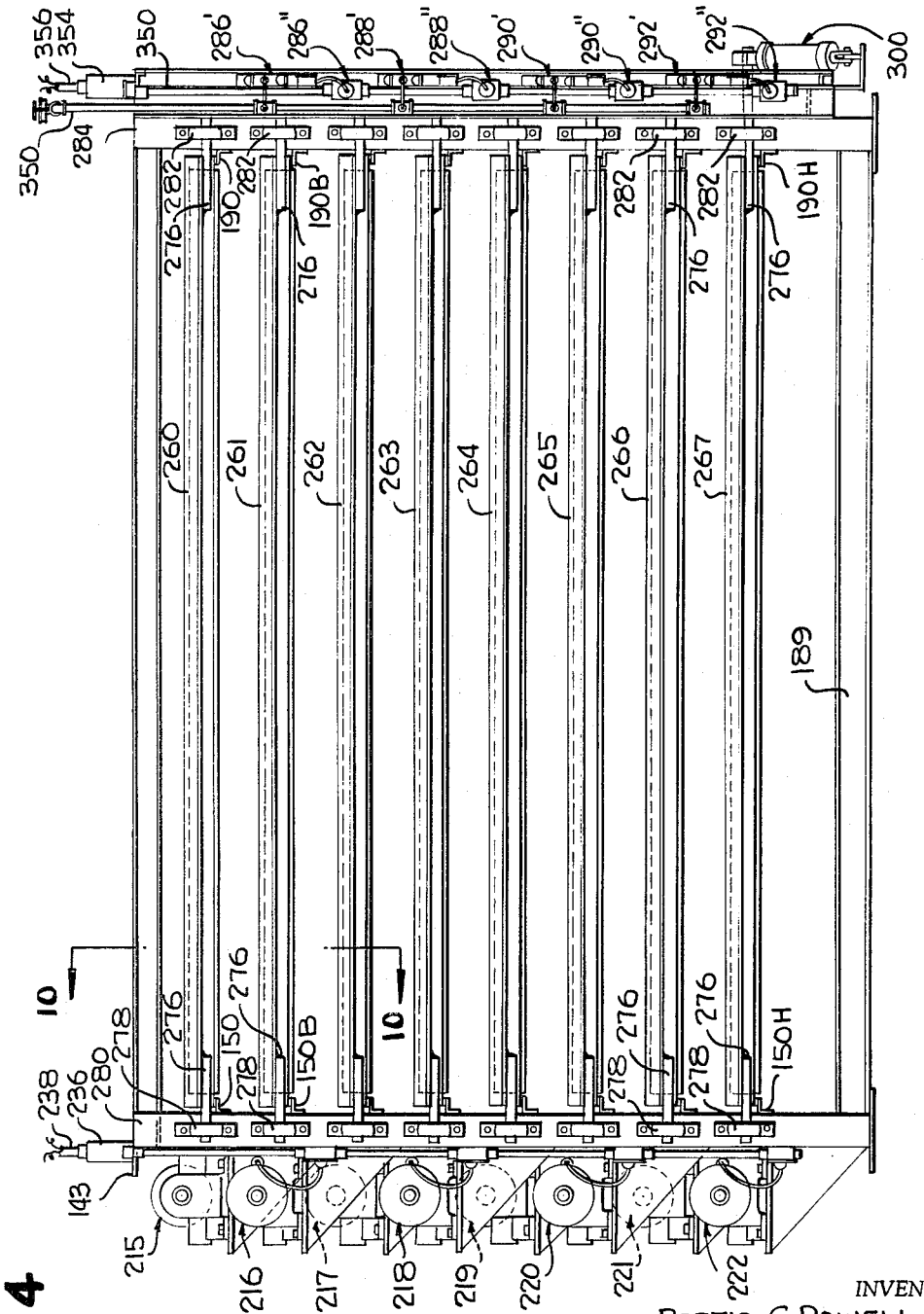

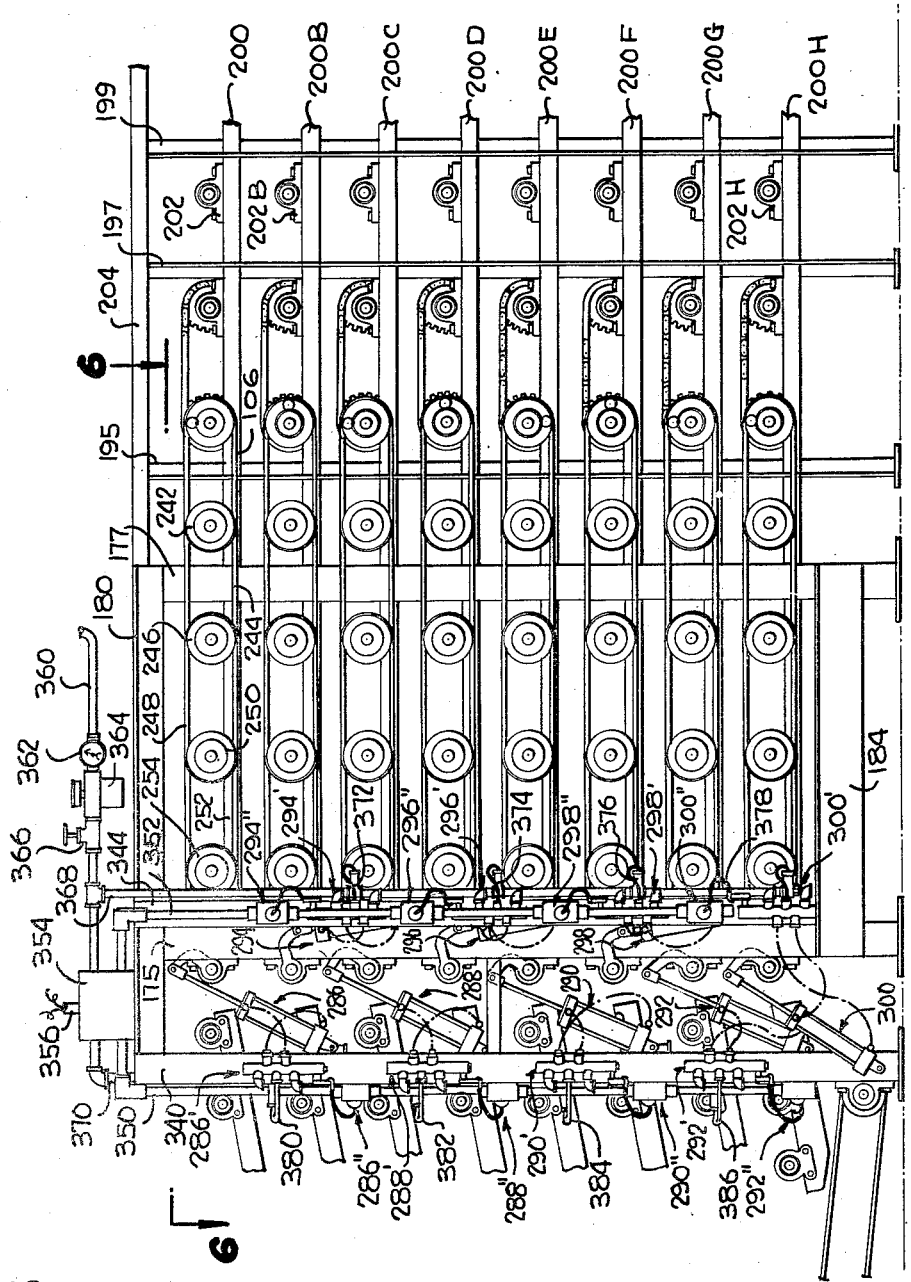

March 8, 1966  B. S. POWELL  3,239,052
UNLOADING MECHANISM FOR MULTI-DECK CONVEYOR APPARATUS
Filed Jan. 17, 1964  9 Sheets-Sheet 6
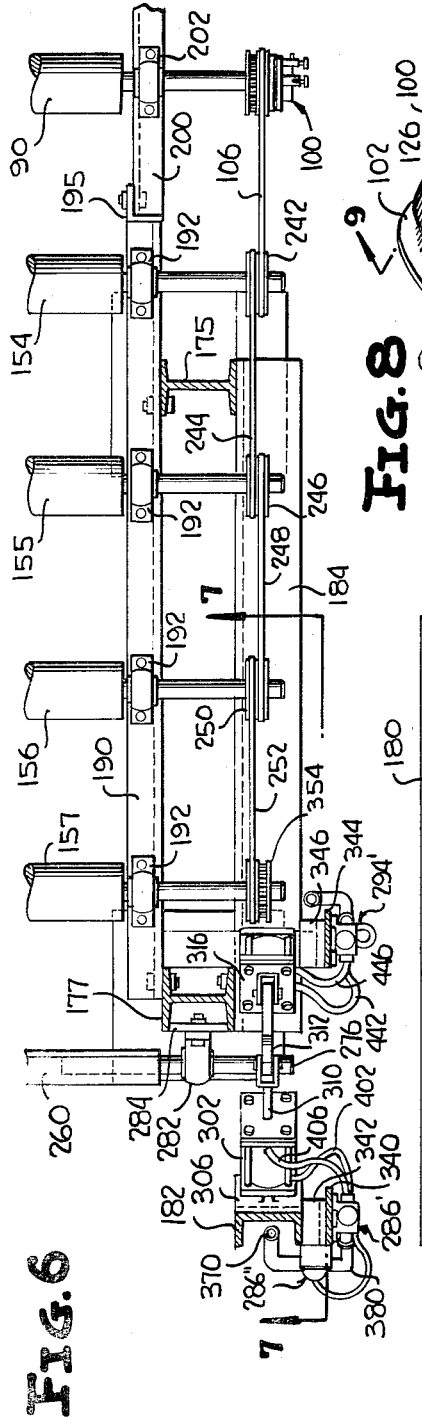
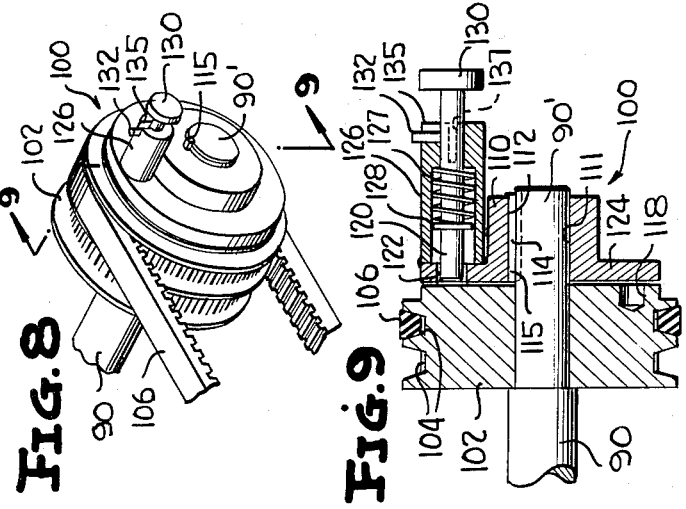
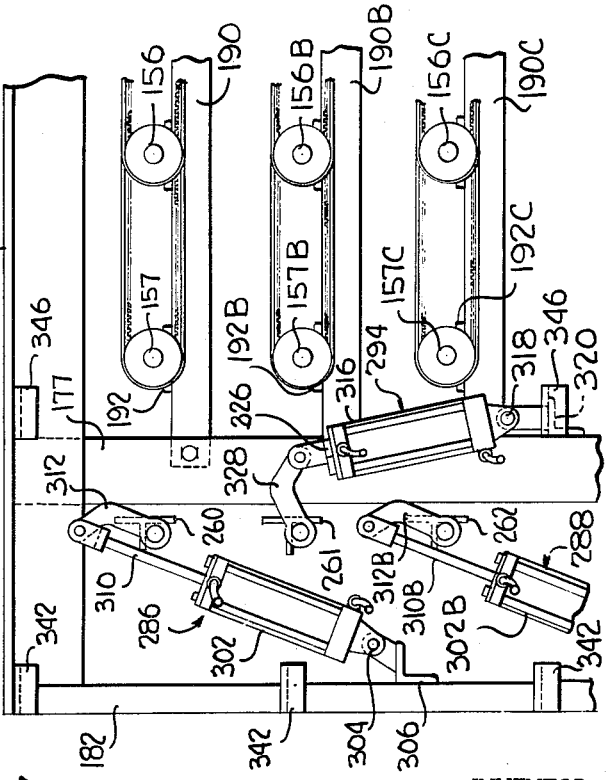
INVENTOR
BERTIS S. POWELL
BY Shoemaker and Mattare
ATTORNEYS

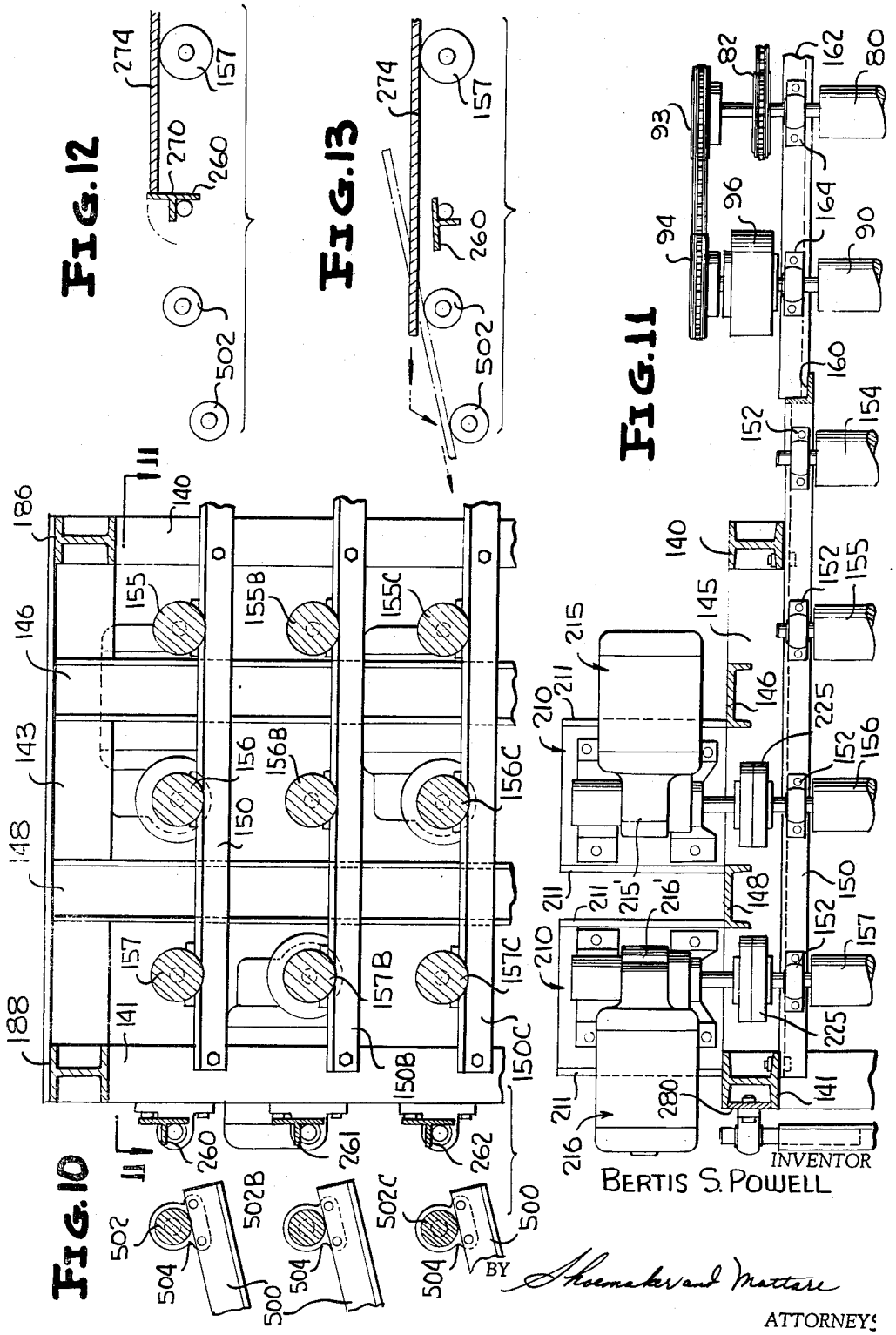

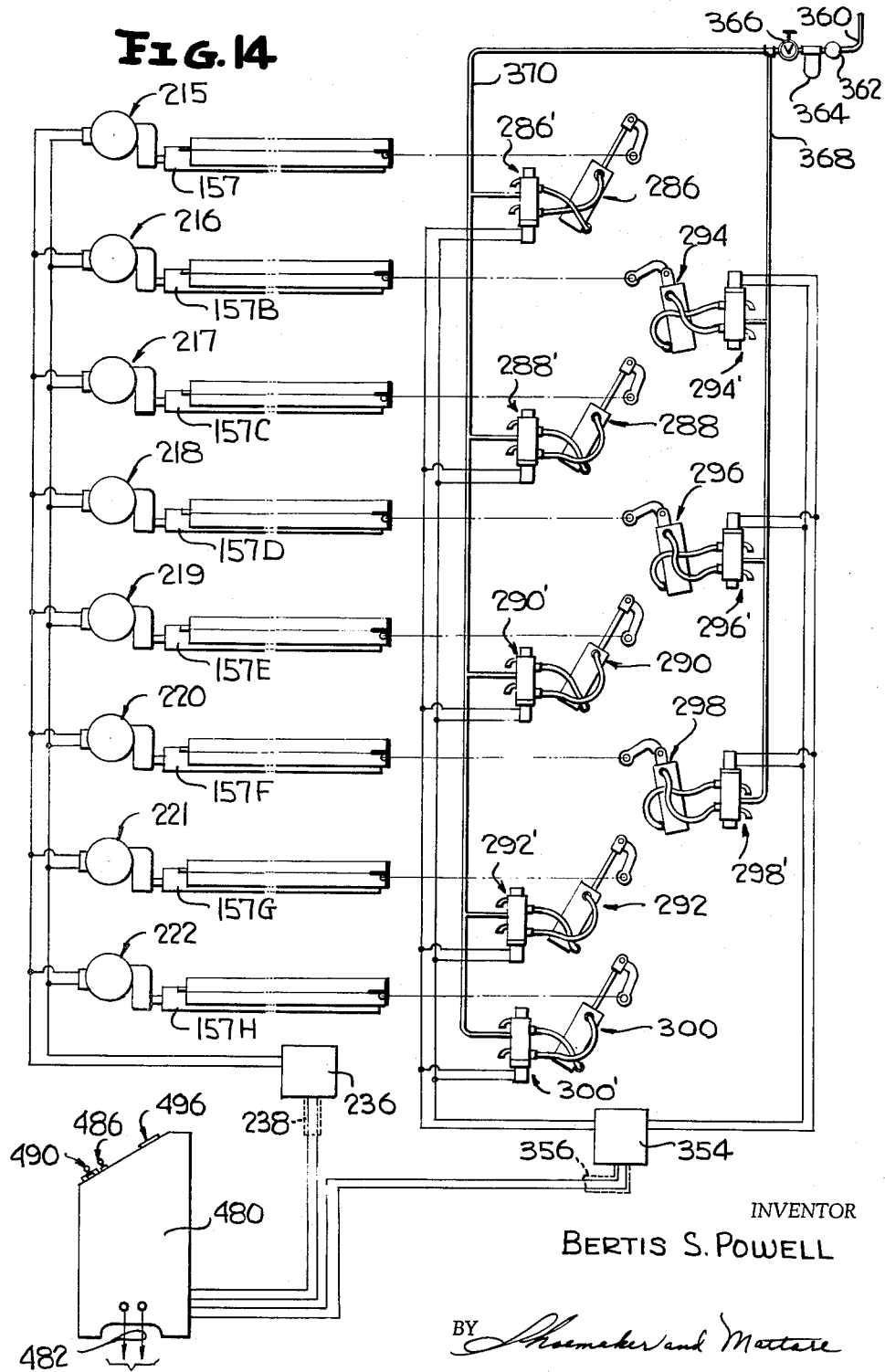

March 8, 1966 B. S. POWELL 3,239,052
UNLOADING MECHANISM FOR MULTI-DECK CONVEYOR APPARATUS
Filed Jan. 17, 1964 9 Sheets-Sheet 9

INVENTOR
BERTIS S. POWELL

BY Shoemaker and Mattare
ATTORNEYS

United States Patent Office 3,239,052
Patented Mar. 8, 1966

3,239,052
UNLOADING MECHANISM FOR MULTI-DECK CONVEYOR APPARATUS
Bertis S. Powell, Savannah, Ga., assignor to National Gypsum Company, Buffalo, N.Y., a corporation of Delaware
Filed Jan. 17, 1964, Ser. No. 338,428
16 Claims. (Cl. 198—20)

The present invention relates to new and novel unloading mechanism for multi-deck conveyor apparatus, and more particularly for unloading mechanism adapted to handle sheet material such as gypsum wallboard and the like.

The unloading mechanism of the present invention is especially adapted for use with conveyor apparatus of the multi-deck type wherein a plurality of decks are provided disposed one over the other, such decks ordinarily comprising a plurality of roller members which are driven in a suitable manner so as to convey wallboard and the like along the upper surfaces of the roller members, the roller members being disposed in parallel spaced relationships with one another and being disposed in substantial horizontal alignment.

This type of conveyor mechanism is generally associated with a drying kiln through which the sheet material passes after having previously been processed, the conveyor mechanism receiving the sheet material directly from the discharge end of the kiln.

For the purpose of illustration, the conveyor mechanism as well as the unloading mechanism has been illustrated as comprising an eight deck unloader arrangement wherein the decks may be disposed approximately one foot apart in a vertical direction, the decks of the unloading mechanism being substantially aligned horizontally with the decks of the conveyor mechanism.

It will be understood that the sheet material is normally fed into the drying kiln in a particular sequence on the various decks which convey the sheet material through the kiln. Ordinarily, the decks of the conveyor mechanism will be unloaded in the same sequence so as to maintain a substantially continuous flow of sheet material through the drying mechanism while at the same time providing a substantially continuous discharge to the final packaging apparatus.

The sheet material is unloaded by the unloading mechanism onto a suitable output feed means which transfers the sheet material to an off-bearing conveyor means which in turn transfers the sheet material to an output deck whereat the sheet material may be suitably packaged or otherwise handled as desired.

The prior art unloading mechanisms for this purpose have utilized rubber pinch rolls in order to control the movement of the sheet material from the conveyor mechanism. Such rubber rolls do not retain a constant diameter because of wear, and this condition causes various pieces of sheet material such as wallboards to overlap on the corners, and to break when pulled during the unloading operation. This condition also causes the pulling action of the rolls to vary thereby causing the various boards to be unloaded such that they are not in alignment with one another, and in particular the leading edges thereof may not be aligned. Accordingly, when two side-by-side wallboards have reached the transfer table normally associated with the discharge from the unloading mechanism, the leading wallboard would often hit the bumper bar provided at the transfer table while the trailing wallboard catches up with the leading wallboard. The leading wallboard in such a case often will receive a smashed corner unless it hits the bumper bar with the leading edge thereof in alignment with the bumper bar.

The present invention is particularly directed to an arrangement which completely eliminates the necessity of providing rubber pinch rolls thereby avoiding the disadvantages attendant therewith and in particular would serve to prevent overlap of the sheet material on the corners of the various pieces thereof and to avoid breakage of the sheet material when pulled by the unloading mechanism.

In the present invention, the unloading mechanism comprises a plurality of similar decks aligned with corresponding decks in the conveyor mechanism, each of the decks of the unloading mechanism including a plurality of substantially parallel and horizontally aligned roller members which are mounted for rotation and which are interconnected for rotation in unison at substantially the same speed. These roller members are additionally driven at a substantially greater speed than the normal speed or rotation of the roller members of the conveyor mechanism such that when the roller members of a particular deck on the unloading mechanism are operated, the sheet material resting on such unloading roller members will be rapidly moved away from the conveyor mechanism and onto the output feed means.

In order to assure that the leading edges of the various pieces of sheet material are perfectly aligned with one another and further to ensure that these pieces of sheet material are substantially parallel with one another when located on the unloading mechanism and as they are being moved off of the unloading mechanism, aligning gate means is provided in the form of members which are pivotally mounted for movement from a gated position which limits the movement of the sheet material over the rollers to a release position which permits free movement of the sheet material over the roller members as the roller members are rotated.

The aligning gate means associated with each deck of the unloading mechanism when in its gated position presents a substantially flat vertical surface facing the roller members of the associated deck, the individual pieces of sheet material being moved into position such that the leading edges thereof engage such flat vertical surface to thereby obtain the desired alignment of the pieces of sheet material.

The aligning gate means of the various decks of the unloading mechanism are each power actuated, and the power actuated means associated with these aligning gate means is controlled along with the driving means for the roller members of each deck in such a manner that the driving roller members of any particular deck of the unloading mechanism are driven by the associated driving means only when the aligning gate means associated therewith is actuated into its release position which permits the sheet material to freely move past the gate means and onto the output feed means. Accordingly, it will be seen that the power actuated means for the various gate means and the driving means for the roller members of the various decks of the unloading mechanism are synchronized so as to be operated simultaneously for any particular deck. Also, the control means ensures that only one deck of the unloading mechanism will be operated at a particular time.

The over-all operation of the unloading mechanism in combination with the conveyor mechanism assures a smooth and rapid movement of the pieces of sheet material to the output feed means without in any way damaging the sheet material, since this sheet material during its feeding motion is in engagement only with the various roller members of the associated mechanisms.

The control means also includes means for automatically operating the various decks of the unloading mechanism in a particular sequence which may be repeated over and over again. This enables the unloading mechanism to operate automatically with a minimum amount of attention from operating personnel. Additionally, means is provided for selectively manually operating the various decks of the unloading mechanism for selectively controlling the sequence in which the various decks are operated.

The control means additionally includes timer means for controlling the duration of operation of any particular deck of the unloading mechanism as well as additional timer means for controlling the interval between operation of different decks of the unloading mechanism particularly during the sequential automatic operation of the various decks.

The output feed means of the present invention comprises a plurality of decks each of which includes roller members similar to those employed in the conveyor mechanism and the unloading mechanism, the various decks of the output feed means converging to the single off-bearing conveyor means which finally carries the various pieces of sheet material to the output deck of the apparatus.

A further novel feature of the present invention is a unique driving interconnection between the roller members of each deck of the conveyor mechanism and the associated roller members of the corresponding deck of the unloading mechanism. This novel driving interconnection includes two different overrunning clutch driving connections and a further positive type clutch driving connection. With this arrangement, the roller members of a particular deck of the unloading mechanism are enabled to operate at a substantially greater speed of rotation than the roller members of the corresponding deck of the conveyor mechanism. On the other hand, the clutch mechanisms may be selectively operated so as to cause a downstream portion of the roller members of the conveyor mechanism to be driven and operated at the same speed of rotation as the roller members of the associated deck of the unloading mechanism. This type of operation may be selectively utilized as desired depending on the size of the pieces of sheet material which are to be unloaded by the apparatus.

An object of the present invention is to provide new and novel unloading mechanism for multi-deck conveyor apparatus which completely eliminates the necessity of providing rubber pinch rolls as employed in the prior art thereby eliminating overlap on the corners of the various pieces of sheet material and to eliminate breakage thereof as occurred with the utilization of rubber pinch rolls.

Another object of the invention is to provide unloading mechanism for multi-deck conveyor apparatus including means for accurately aligning the leading edges of the various pieces of sheet material to cause the pieces to emerge from the unloading apparatus in an even and uniform manner and in substantial parallel paths.

A further object of the invention is the provision of unloading mechanism for multi-deck conveyor apparatus which enables smooth and rapid movement of various sized pieces of sheet material to the output feed means without damaging the pieces of sheet material in any way.

Still another object of the invention is to provide unloading mechanism for multi-deck conveyor apparatus which includes control means for automatically controlling the sequence of unloading of the various decks of the unloading mechanism and further which permits adjustment of the time intervals involved in operation of the various decks.

Yet another object of the invention is the provision of unloading mechanism for multi-deck conveyor apparatus including a novel drive means which permits the roller members of a particular deck of the unloading mechanism to operate at a substantially greater speed of rotation than the roller members of the corresponding deck of the conveyor mechanism, or which on the other hand may be selectively operated such that the roller members of the unloading mechanism serve to drive certain roller members of the conveyor mechanism at the same rapid speed as the roller members of the unloading mechanism.

Other objects and many attendant advantages of the invention will become more apparent when considered in connection with the specification and accompanying drawings, wherein:

FIG. 2 is a broken away side view of a portion of the apparatus shown in FIG. 1;

FIG. 3 is a top view of that portion of the apparatus illustrated in FIG. 2;

FIG. 4 is a front view of the unloading mechanism with the output feed means removed for the purpose of illustration;

FIG. 5 is a side view of the opposite side of the apparatus from the view illustrated in FIG. 2;

FIG. 6 is a sectional view taken substantially along line 6—6 of FIG. 5 looking in the direction of the arrows;

FIG. 7 is a sectional view taken substantially along line 7—7 of FIG. 6 looking in the direction of the arrows;

FIG. 8 is an enlarged top perspective view partly broken away illustrating the positive clutch mechanism of the apparatus;

FIG. 9 is a sectional view taken substantially along line 9—9 of FIG. 8 looking in the direction of the arrows;

FIG. 10 is a sectional view taken substantially along line 10—10 of FIG. 4 looking in the direction of the arrows;

FIG. 11 is a sectional view taken substantially along line 11—11 of FIG. 10 looking in the direction of the arrows;

FIG. 12 is a somewhat schematic illustration showing the relative relationship of the aligning gate means with respect to the adjacent rollers and the manner in which a sheet of material passes thereover, FIG. 12 illustrating a first position wherein a sheet of material is limited in its movement by the gate means;

FIG. 13 is a view similar to FIG. 12 illustrating the gate means in a different position which allows free movement of a sheet of material thereover;

FIG. 14 is a somewhat schematic illustration of the control means and the circuit associated therewith for controlling the operation of the gate means and the power actuating means connected therewith, as well as the control means connection for synchronizing the operation of the roller members of the particular decks of the unloading mechanism;

Figure 1:
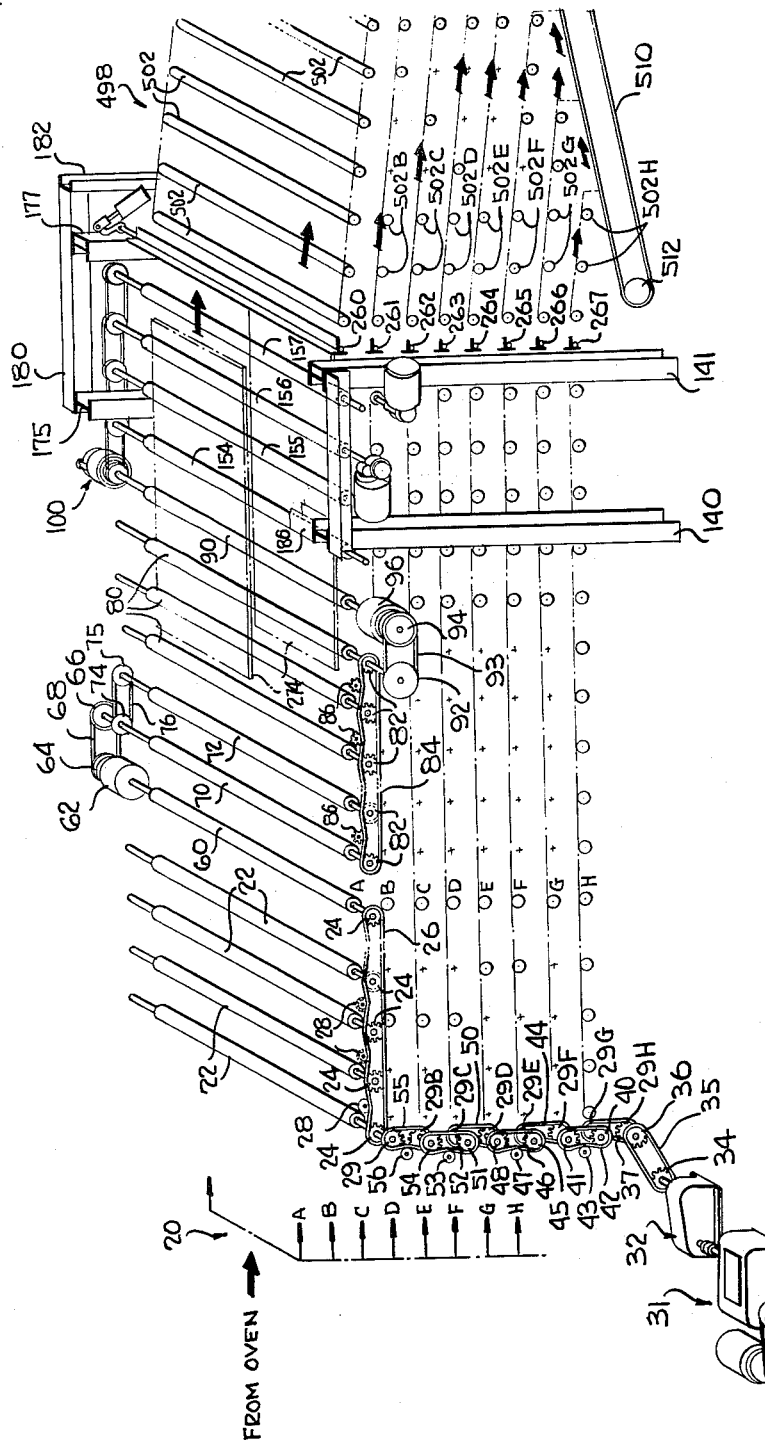
FIG. 1 is a top perspective somewhat schematic view of the over-all arrangement of the present invention with certain of the components removed for the sake of clarity.

Referring now to the drawings wherein like reference characters designate corresponding parts throughout the several views, the over-all arrangement of the invention is seen in FIG. 1, and the exit or discharge portion of a drying kiln or oven is indicated schematically by reference numeral 20, the example of the present invention being particularly directed to a drying oven for gypsum wallboard and the like, although it is understood that the invention is equally applicable to any other type of sheet material which it is desired to unload from a multi-deck conveyor apparatus.

As seen in FIG. 1, the discharge of the drying oven is indicated as passing outwardly therefrom by the arrows identified by letters A through H inclusive. Each of the arrows indicates a particular deck or horizontal level at which the sheet material is discharged, it being apparent that the material is discharged at eight separate vertical positions, the sheet material issuing in a substantially horizontal direction. The conveyor mechanism positioned adjacent the discharge from the oven is provided with a corresponding number of decks which will also be identified with corresponding letters A through H, it being understood that the various decks A through H of the conveyor mechanism are normally aligned with the discharge portions A through H from the drying oven so as to receive sheet material therefrom.

Each of the decks of the conveyor mechanism are substantially identical with one another, and accordingly a description of the specific structure of the uppermost deck A of the conveyor mechanism will suffice for an understanding of the operation of the entire conveyor mechanism. In a similar manner, the various decks of the unloading mechanism are of substantially identical construction, and accordingly the structure of the uppermost deck of the unloading mechanism will be specifically described. The various components of the other decks of the conveyor mechanism as well as the unloading mechanism which are similar to those of the uppermost decks of these two mechanisms will be identified with the similar reference characters followed by a letter indicating the particular deck which is being indicated.

The uppermost deck A of the conveyor mechanism includes a first plurality of roller members 22. These roller members as well as all of the roller members employed in both the conveyor mechanism and the unloading mechanism as well as the output feed means hereinafter discussed are hard steel roller members, all of the various roller members being supported for rotation and extending substantially parallel with one another and transverse to the direction of feed of sheet material thereover. These various roller members serve to move the sheet material in a direction of feed as indicated by the arrows in FIG. 1 by suitable driving mechanism associated with the various roller members and as hereinafter described.

Any suitable number of roller members 22 may be provided, and these roller members are indicated as being four in number solely for the purpose of illustration. The roller members are mounted for rotation in suitable pillow block bearings and the like which are in turn supported upon a framework including suitably interconnected vertical and horizontal members as is well known and conventional. A portion of the framework for supporting these roller members will be described hereinafter.

Sprocket members 24 are rigidly affixed to one end of each of the roller members 22, these various sprocket members being interconnected by means of a driving chain 26 which also engages idler gears 28 which are suitably adjustably mounted upon the supporting framework. It will accordingly be apparent that the roller members 22 of the conveyor mechanism are positively drivingly interconnected with one another. A driving sprocket 29 is connected with a rearward one of said sprockets 24 for transmitting power to the various chain interconnected sprockets 24.

A suitable power driving means indicated generally by reference numeral 31 may comprise any type of readily available driving mechanism such as an electric motor, a gas engine or the like which drives through a speed reducer mechanism 32 to an output sprocket 34 which is connected through a chain 35 with a sprocket 36. Sprocket 36 is in turn connected with a driving sprocket 29H which corresponds to the driving sprocket 29 for the uppermost deck as previously discussed.

Driving sprocket 29H is drivingly interconnected by driving chain 37 with the driving sprocket 29G of the next deck above the lowermost deck of the conveyor mechanism. A sprocket 40 is connected with driving sprocket 29G and is in turn drivingly connected with a sprocket 41 connected with driving sprocket 29F through the intermediary of a driving chain 42 running over an idler gear 43. Driving sprocket 29F is in turn connected with driving sprocket 29E through the intermediary of a driving chain 44.

A sprocket 45 is interconnected with driving sprocket 29E and in turn is drivingly connected by means of a driving chain 46 passing over an idler gear 47 with a sprocket 48 which in turn is rotatably connected with driving sprocket 29D. Driving sprocket 29D is in turn drivingly connected by means of chain 50 with driving sprocket 29C. A sprocket 51 is connected for rotation with driving sprocket 29C and is connected by means of a driving chain 52 running over an idler gear 53 with a sprocket 54 which is drivingly connected with driving sprocket 29B. Sprocket 29B is in turn connected by means of chain 55 passing over an idler gear 56 with the sprocket 29 previously described.

It will be understood that each of the sprockets 29B through 29H inclusive correspond with the sprocket 29 associated with the uppermost deck of the conveyor means, and accordingly it will be apparent that the power driving mechanism 31 serves to positively drive all of the rollers 22 of the various decks of the conveyor, these rollers all being positively drivingly interconnected with one another for rotation at a uniform speed.

Downstream of the roller members 22 in relation to the direction of feed of sheet material through the apparatus is located a roller member 60 which is drivingly interconnected with roller members 22 by means of the drive chain 26 previously described. Roller member 60 is provided with a sprocket 24 at one end thereof, and an overrunning clutch mechanism 62 is provided at the opposite end of roller member 60, this overrunning clutch mechanism providing a driving interconnection between roller member 60 and a sprocket member 64. The interconnection is such that roller member 60 normally drives sprocket 64, but the overrunning clutch mechanism 62 permits sprocket 64 to overrun or rotate faster than roller member 60 if so desired as hereinafter described.

Sprocket 64 is connected with a sprocket 66 by means of a drive chain 68. Sprocket 66 is fixed to the outer end of roller member 70 which is similar to the roller members previously described. A roller member 72 is disposed immediately downstream of roller member 70, a sheave 74 being fixed for rotation with roller member 70, and a corresponding sheave 75 being fixed for rotation with roller member 72, sheaves 74 and 75 being interconnected by a suitable drive belt 76.

A plurality of roller members 80 which may be of any number, but which are illustrated as being three in number are disposed downstream of roller member 72. Roller members 70, 72 and 80 are each provided with sprockets 82 at one end thereof which are drivingly interconnected with the respective roller members and which are further drivingly interconnected with one another by means of a driving chain 84 traveling over idler gears 86 which are suitably adjustably mounted on a supporting framework.

The roller member 80 which is further downstream of the apparatus is drivingly interconnected with a roller member 90 of the conveyor mechanism by means of a further overrunning clutch arrangement. A sprocket 92 is fixed to the outer end of the last-mentioned roller member 80 and this sprocket member is in turn connected by means of a driving chain 93 with a sprocket member 94. Sprocket member 94 is connected with roller member 90 through an overrunning clutch 96, the overrunning clutch being so arranged that sprocket member 94 normally does not transmit any drive to roller member 90, but on the other hand roller member 90 is adapted to drive sprocket member 94 when roller member 90 is traveling at a greater speed of rotation than the sprocket member 94.

A clutching arrangement indicated generally by reference numeral 100 is also interconnected with the opposite end of roller member 90, this clutching arrangement being illustrated in detail in FIGS. 8 and 9. As seen in these two figures, a sheave member 102 is rotatably journalled on a reduced end portion 90' of roller member 90. This sheave member includes a pair of peripheral grooves 104 which may be suitably serrated if desired in order to provide a good frictional driving connection and which are adapted to receive complementary shaped driving belts. A driving belt 106 is illustrated as being disposed in driving relationship within one of the grooves 104 as seen in FIGS. 8 and 9.

A clutch member 110 is provided with a central bore 111 which receives the reduced end portion 90' of roller member 90, clutch member 110 having a groove 112 formed therethrough opening into the bore 111. Groove 112 is adapted to be aligned with the groove 114 provided in the outer end of reduced portion 90', and a key member 115 is disposed in the aligned grooves 112 and 114 for keying clutch member 110 to roller member 90.

In order to provide a driving connection between sheave 102 and the clutch member 110, the sheave is provided with a hole 118 formed in the outwardly facing surface thereof, this hole being adapted to receive the inner end of a pin member 120 which is slidably disposed within a hole 122 provided in the radially outwardly extending flange portion 124 of the clutch member 110. A substantially cup-shaped portion 126 is fixed to the outwardly facing surface of flange portion 124 of the clutch member, a compression coil spring 127 being disposed within the interior of member 126 and bearing against an annular shoulder 128 formed on the pin member for urging the pin member toward its operative clutch-engaging position wherein the end of the pin member 120 is disposed within the hole 118.

Pin member 120 is provided with an enlarged head 130 at the outer end thereof, and a radially outwardly extending lug 132 is formed on the outer surface of pin 120. This lug 132 is adapted to slide within either one of a pair of longitudinally extending slots 135 and 137 formed in the cup-shaped member 126.

As illustrated in FIGS. 8 and 9, the lug member 132 is illustrated as being seated within the slot 135 whereby the pin member 120 is retained in its outward or release position wherein there is no driving interconnection between the sheave 102 and the clutch member 110. When it is desired to make such a driving connection, the pin member is pulled outwardly until lug 132 clears slot 135 whereupon the pin is rotated to a position such that the lug member 132 is adapted to slide inwardly within slot 137. Slot 137 extends a considerable distance further inwardly toward sheave member than slot 135 whereby when the lug member 132 is seated within slot 137, the inner end of pin member 120 is adapted to seat within the hole 118 in the sheave member to thereby provide a positive driving interconnection between roller member 90 and sheave 102.

The multi-deck unloading mechanism includes an open framework for supporting the various components, and at one side of the mechanism this framework includes a pair of spaced vertically extending H-beams 140 and 141 which are suitably supported on a supporting surface, these H-beams being interconnected at the upper end portions thereof by means of an angle member 143 which is secured to the outwardly facing surfaces of these H-beams as by welding or the like. The two H-beams are similarly interconnected at the lower portions thereof by means of angle means 145 which is also fixedly secured in operative position as by welding of the like. A pair of vertically extending channel members 146 and 148 extend in spaced parallel relationship with the H-beams 140 and 141 and may also be similarly secured to the angle means 143 and 145 to provide a rigid structure.

As seen most clearly in FIGS. 2 and 10, horizontally extending members 150 are secured to the inner surfaces of H-beams 140 and 141 as by bolts or the like and a horizontal angle member 150 is provided for each of the decks of the multi-deck unloading mechanism. Each of the horizontal members 150 supports a plurality of spaced adjustable pillow block bearings 152 which are shown as being four in number and which serve to rotatably support one end of the roller members 154 and 155, 156 and 157 of the unloading mechanism.

The conveyor mechanism on the same side of the apparatus includes a plurality of spaced vertical upstanding support members three of which are shown in FIG. 2 and which are identified by reference characters 160, 162 and 164. These spaced vertical members of the conveyor mechanism serve to support a plurality of horizontally extending spaced support members 166, a horizontal support member 166 being provided for each of the decks of the conveyor mechanism and being identified by the same reference numeral followed by the letter signifying a particular deck. These horizontal support members 166 support spaced pillow block bearings 168 which are adjustable and which serve to rotatably support the various roller members of the conveyor mechanism. A horizontally extending frame member 170 serves to interconect the upper end portions of the vertically extending frame members 160, 162, 164 and various other vertically extending similar frame members (not shown). Turning now to the opposite side of the apparatus, the framework includes a pair of spaced vertically upstanding H-frame members 175 and 177, these vertically extending frame members being rigidly interconnected at their upper portions by an angle member 180 which is suitably secured thereto as by welding or the like, this angle member also being rigidly affixed to the upper end of a vertically extending channel member 182. The H-frame members 175 and 177 are interconnected at the lower portions thereof by a horizontally extending angle member 184 which is secured thereto as by welding or the like.

A pair of transversely extending H-frame members 186 and 188 are provided, the opposite ends of cross frame member 186 being rigidly affixed to the upper ends of the vertical frame members 140 and 175, and the opposite ends of frame member 188 being rigidly affixed to the upper end portions of the vertical frame members 141 and 177. Similar transversely extending frame members are provided between the lower ends of the vertical frame members, one of such transversely extending frame members being indicated by reference numeral 189 in FIG. 4. It is apparent that this interconnection will provide a very rigid over-all framework for the structure.

A plurality of spaced horizontally extending support members 190 are secured to the inner portions of the H-frame members 175 and 177 as by bolts or the like, each of these frame members 190 supporting a plurality of spaced pillow block bearings 192 which rotatably support the associated end portions of the roller members 154, 155, 156 and 157 of the unloading mechanism.

The conveyor mechanism at this side of the apparatus includes a plurality of spaced vertical frame members, three of which are shown and which are identified by reference characters 195, 197 and 199. A plurality of spaced horizontal support members 200 are suitably secured to these vertical frame members as by bolts or the like and serve to support adjustable pillow block bearings 202 thereon. These pillow block bearings serve to support the end portions of the associated roller members of the conveyor mechanism. The upper end portions of the vertical members 195, 197, 199 are interconnected by a horizontal frame member 204 suitably affixed thereto as by welding and the like.

Turning now to the opposite side of the apparatus and as seen particularly in FIGS. 2 and 11, a plurality of motor supports are illustrated, these motor supports being indicated by reference numerals 210, each of these motor supports including a pair of downwardly and inwardly tapering side leg portions 211 which are supported by the adjacent vertical support members of the framework, the motor supports being retained in operative position as by welding or otherwise permanently affixing them to the associated vertical frame members.

A plurality of driving motors are provided, these driving motors being eight in number and being identified by reference characters 215 through 222 inclusive. It will be noted that a driving motor is provided for each individual deck of the unloading mechanism. These driving motors are each connected with gear reducing mechanisms 215' through 222' respectively, these gear reducing mechanisms in turn being drivingly interconnected through like flexible couplings 225 with certain roller members of the unloading mechanism.

Driving motors 215, 217, 219 and 221 are drivingly interconnected with the roller members 156 of decks A, C, E and G respectively of the unloading mechanism. The driving motors 216, 218, 220 and 222 are drivingly connected with the roller members 157 of decks B, D, F and H respectively of the unloading mechanism.

It will be noted throughout the description that the driving interconnections with the various roller members of the apparatus are effected through the intermediary of the reduced end portions of the respective roller members which are journalled within the associated pillow block bearings and extend therethrough.

The various electric driving motors 215 through 222 inclusive are connected by means of plug and socket connections 230 with suitable electric leads provided in conduits 232 and 234 which may be of metal or other similar material for protecting the electric leads. These conduits are in communication with a junction box 236 supported on the upper portion of frame member 143, and a cable 238 extends from the junction box back to the control panel as hereinafter described.

Turning again to the opposite side of the apparatus particularly seen in FIGS. 5 and 6, the drive belt 106 connects sheave 102 with a similar sheave 242 which is fixed to the reduced outer end of roller member 154. Sheave 242 is in turn connected by means of a drive belt 244 with a sheave 246 affixed to the reduced outer end of roller member 155.

Sheave 246 is drivingly connected by means of a drive belt 248 with a sheave 250 affixed to the reduced outer end of roller member 156. Sheave 250 is in turn drivingly connected by means of drive belt 252 with a sheave 254 secured to the reduced outer end of roller member 157.

It will accordingly be apparent that the roller members 154, 155, 156 and 157 are all drivingly interconnected by means of the sheaves and drive belts for rotation in unison at substantially the same speed. All of these roller members may also be drivingly interconnected with the roller member 90 when the clutch mechanism 100 is selectively engaged as hereinbefore discussed. When the driving motor for any particular deck of the unloading mechanism is energized, all of the driving roller members of the particular deck will thereby be driven at the same uniform speed. This assures smooth and rapid movement of the sheet material over the roller members. The driving motors are also adapted to drive the roller members of the unloading mechanism at a substantially greater speed than the speed of rotation of the roller members of the conveyor mechanism to thereby ensure that the sheet material will be rapidly carried away from the roller members of the conveyor mechanism during the unloading operation.

Figure 16:
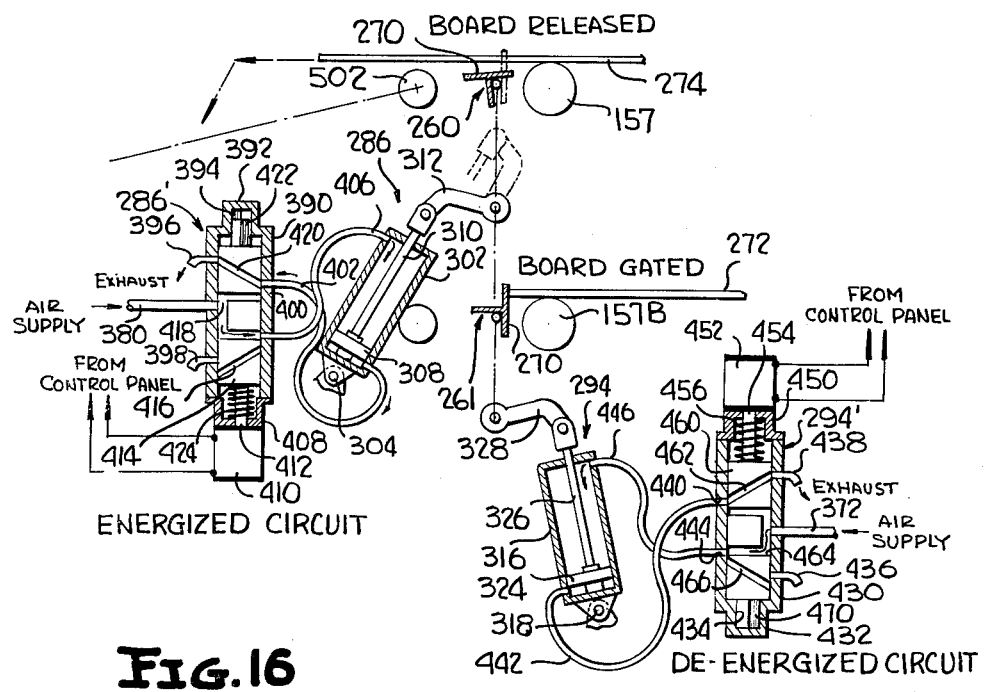
FIG. 16 illustrates in a sectional view the manner in which the power actuated means associated with the aligning gate means is operated for controlling movement of the gate means between its gated position and its release position.

As seen particularly in FIG. 4, eight separate and individually operable aligning gate means are provided, these gate means being each associated with one of the particular decks of the unloading mechanism and being identified by reference numerals 260 through 267 inclusive. Each of these aligning gate means may be formed as illustrated in FIG. 16 so as to be of substantially T-shaped cross-sectional configuration, each of the gate means including a flat surface 270 which as illustrated in the gated position of FIG. 16 as shown with respect to the gate means 261 accordingly presents a flat vertical surface for a piece of wallboard or the like indicated generally by reference numeral 272. It is evident that in the gated position as seen in FIG. 16, the gate means will serve to positively arrest and position the sheet material which is driven forwardly by the roller members of the conveyor mechanism to the position illustrated in FIG. 16. Also as seen in FIG. 16, the gate means may be pivoted into the position shown by gate means 260 which is the release position and which allows another piece of wallboard 274 to freely move forwardly and be unloaded from the apparatus onto the output feed means hereinafter described.

Each of the aligning gate means 260 through 267 inclusive is provided with laterally outwardly extending cylindrical rod portions 276 at opposite ends thereof, the cylindrical portions at one end of the gate means being rotatably journalled in pillow block bearings 278 which are supported on a plate 280 which is suitably affixed to the H-frame member 141. The cylindrical portions 276 at the opposite ends of the gate means are rotatably journalled within pillow block bearings 282 which are in turn suitably secured as by bolts or the like to a plate 284 which is suitably secured to the H-frame member 177.

The various gate means are adapted to be operated by power actuated means which is seen most clearly for the over-all arrangement in FIG. 5. As seen in this figure, the power actuated means for gate means 260, 262, 264, 266 and 267 are disposed in substantially vertical aligning and are indicated respectively by reference characters 286, 288, 290, 292 and 300. The power actuated means for gate means 261, 263 and 265 are indicated generally by reference characters 294, 296 and 298 and are also disposed in substantial vertical alignment.

Referring now particularly to FIG. 7, each of the power actuated mechanisms 286, 288, 290, 292 and 300 are of substantially identical construction, each including a pneumatic cylinder 302 which is pivoted at 304 to a supporting bracket 306 affixed to the vertically extending frame member 182. As seen in FIG. 16, a piston 308 is slidably disposed within the cylinder 302, and a piston rod 310 extends outwardly of the cylinder and is pivotally connected to a link 312 the opposite end of which is affixed to the outer end portion of the associated cylindrical portion 276 connected with one of the gate means. It will be apparent as seen in FIG. 7 that when the piston rods 310 of the power actuated units 286, 288, 290, 292 and 300 are extended, the gate means 260, 262, 264, 266 and 267 are held in their gated position for stopping movement of sheet material through the unloading mechanism. On the other hand, it will be apparent that when these power actuated units are operated so as to draw the piston rods inwardly to the full line position shown in FIG. 16, the gate mean associated therewith will be moved to its release position as illustrated by gate means 260 in this figure.

Each of the power actuated units 294, 296, and 298 is of similar construction and includes a pneumatic cylinder 316 which is pivoted at 318 to a supporting bracket 320 secured to H-frame member 177. A piston 324 as seen in FIG. 16 is slidably positioned within each of cylinders 316 and is connected with a piston rod 326 which extends outwardly of the cylinder and which is pivotally interconnected with a link 328. Each of these links 328 is interconnected with the outer end portion of the cylindrical portion 276 connected with one of the gate means.

As seen particularly in FIG. 16, it is apparent that when the pistons of each of the power actuated units 294, 296 and 298 are withdrawn as shown in full lines in this figure, the associated gate means will be maintained in its gated position. Movement of the piston upwardly as seen in FIG. 16 so as to move piston rod 326 outwardly will of course in turn pivot the gate means 261 into its release position.

As seen particularly in FIG. 5 control valve means 286', 288', 290' and 292' are provided for the power actuated units 286, 288, 290 and 292 respectively, these control valves being mounted upon a plate 340 which is supported by a plurality of vertically spaced bracket members 342 as seen in FIG. 7 which are suitably secured as by welding to the vertically upstanding frame member 182. Control valves 294', 296', 298' and 300' are provided for the power actuated units 294, 296, 298 and 300 respectively, this latter group of control valves being supported upon a plate 344 which is supported by a plurality of vertically spaced bracket members 346 which are secured as by welding or the like to H-frame member 177.

Each of the control valves 286'–300' inclusive as previously described is a solenoid-operated type valve, the solenoid-operated mechanisms of these various valves being connected to appropriate electrical leads for operation of the valves. Control valves 286', 288', 290' and 292' are provided with plug and socket connections 286'', 288'', 290'' and 292'' respectively which serve to connect the solenoid-actuating mechanisms of the control valves to suitable electrical leads provided within a conduit portion 350 which in turn is connected with a junction box 354. The control valves 294', 296', 298' and 300' are provided with plug and socket connections 294'', 296'', 298'' and 300'' which in turn provide electrical connection with leads disposed within a conduit 352 which is also connected with a junction box 354. A cable 356 provides communication between the junction box 354 and the control panel hereinafter described.

A source of gas pressure such as air for operating the penumatic cylinders is provided at a remote location and is connected by means of a conduit 360 with the control valves which operate the various power actuated units for the gate means. A gauge 362 is connected in conduit 360 as well as a filter means 364 and a valve 366 for controlling the flow of air through this conduit. The conduit 360 in turn is connected with branch conduits 368 and 370 which extends downwardly of the apparatus as seen in FIG. 5.

Flexible conduits 372, 374, 376 and 378 are connected through suitable interconnections with conduit portion 368 so as to provide air pressure to the control valves 294', 296', 298' and 300' respectively. Similar flexible conduit portions 380, 382, 384 and 386 provide communication between the conduit portion 370 of the airline and the control valves 286', 288', 290' and 292' respectively. In this manner, air pressure is provided to each of the control valves of the apparatus.

Referring now particularly to FIG. 16, the construction and mode of operation of the control valves is clearly illustrated. The two uppermost control valves 286' and 294' which are operatively associated with the power actuated units 286 and 294 are illustrated and will be described in detail. It should be understood that the construction and operation of all of the control valves is identical with the two described in connection with FIG. 16, and accordingly, description of these two specific valves will suffice for an understanding of the entire construction of the apparatus.

As seen in FIG. 16, the control valve 286' includes a substantially cylindrical main body portion 390 having a reduced end portion 392 at one end thereof with a bore 394 of polygonal cross sectional configuration. A pair of spaced exhaust conduit portions 396 and 398 provide communication between the interior of the cylindrical body portion 390 and atmosphere. At the opposite side of the body portion 390 there is provided a first port 400 which is in communication with a flexible conduit portion 402 which connects port 400 with one end of the pneumatic cylinder 302. A second port 404 is formed in said opposite side of the body portion 390 of the control valve and is connected by means of a flexible conduit 406 with the opposite end portion of a pneumatic cylinder 302.

The lower end of the body portion 390 is provided with a reduced end portion 408 to which is attached a conventional solenoid 410, the plunger 412 of which is operatively connected with a piston member 414 slidably mounted within the body portion 390. The piston body 414 is provided with a first oblique passage 416, and a substantially U-shaped passage 418 is provided at the intermediate portion of the piston body. A second oblique passage 420 is provided in the upper portion of the piston body. The uppermost end of the piston comprises a reduced portion 422 having a polygonal configuration complementary to the recessed portion 394 of the housing whereby interengagement of the portion 422 within the portion 394 prevents relative rotation or turning between the piston body and the body portion 390.

A compression spring member 424 is disposed about the plunger portion 412 and normally urges the piston body 414 in an upward direction as seen in FIG. 16. As illustrated, the solenoid 410 is shown as being energized so as to pull the plunger downwardly to thereby lower the piston body within the body portion 390 into the operative position as shown.

In the operative position shown for the control valve 286' in FIG. 16, it will be seen that the air pressure entering through the flexible conduit portion 380 passes through the U-shaped passage 418 in the piston body and thence through port 404 and flexible conduit portion 406 into the upper end of the penumatic cylinder body 302 so as to force the piston 308 to the lower end of the cylinder as seen in this figure. In this position, with the solenoid energized, it will be seen that the power actuated means is operated so as to move the gate means 260 into its release position. In this release position, the board 274 is free to move forwardly over the roller members of the unloading mechanism.

When the solenoid 410 is de-energized, the spring 424 will force the piston body upwardly. In its energized position as shown, it will be noted that the oblique passage 420 permits the air within the pneumatic cylinder 302 to be exhausted through the exhaust portion 396. On the other hand, when the spring member pushes the piston body upwardly, it will be seen that oblique passage 416 will provide communication between the flexible conduit 406 and the discharge outlet 398 thereby exhausting the upper portion of the pneumatic cylinder 302 to atmosphere, while the flexible counduit portion 402 will be brought into communication with the upper part of the U-shaped passage 418 in the piston body to thereby provide air pressure to the lower part of the penumatic cylinder 302 to thereby force the piston 308 upwardly and move the gate means back into its gated position as illustrated in dotted lines in FIG. 16.

It will accordingly be apparent that the spring member of the control valve normally urges the control valve into such a position as to cause the power actuated means to move the gate means into its gated position. On the other hand, when the solenoid of the control valve is operated, the control valve is moved into a position which causes the power actuated means to be moved to a position pivoting the gate means into its release position. The gated position for the link 312 as well as the upper end of the piston rod 310 is illustrated in dotted lines in FIG. 16.

The control valve 294' for the power actuated means 294 includes a substantially cylindrical body portion 430 having a reduced end portion 432 with a recess 434 of polygonal cross section formed therein. A pair of spaced exhaust conduits 436 and 438 provide communication between the interior of the body portion 430 and atmosphere.

A first port 440 is provided in the opposite side of the body means and is connected by means of flexible conduit 442 with the lower end of the pneumatic cylinder 316. A second portion 444 is provided in the opposite side of the body portion 430 and is connected by means of flexible conduit 446 with the upper end of the pneumatic cylinder 316.

The upper end of the body portion 430 as seen in FIG. 16 is provided with a reduced end portion 450 to which is secured a conventional solenoid 452. The plunger 454 of the solenoid extends inwardly through end portion 450 and is surrounded by a compression spring 456 which normally bears against the piston body portion 460 and urges it downwardly as seen in FIG. 16.

A first oblique passage 462 is provided in the body portion, and a substantially U-shaped passage 464 is provided at the intermediate portion of the piston body. A second oblique passage 466 is provided at the lower portion of the piston body as seen in FIG. 16. A reduced end portion 470 is provided at the bottom of the piston body as seen in FIG. 16 and is slidably received within the recessed portion 434 of the body 430 to prevent relative turning or rotation between the piston body and the body portion 430.

As seen in FIG. 16, solenoid 452 is de-energized such that the spring 456 urges the piston body downwardly thereby causing passage 462 in the piston body to be in communication with the lower end of the pneumatic cylinder 316. At the same time, the U-shaped passage 464 in the piston body provides air pressure through the flexible conduit 446 to the upper portion of the pneumatic cylinder 316 thereby urging the piston 324 downwardly into the position shown which moves the gate means 261 into its gated position as shown which prevents any forward movement of the board 272 toward the discharge portion of the apparatus.

It will be noted particularly in connection with FIG. 16 and FIG. 5 that the arrangement is such that the power actuated mechanisms 286, 288, 290 and 292 as well as 300 are each in the gated position when the piston rods thereof are extended as shown, while on the other hand, the power actuated units 294, 296 and 298 are arranged such that the associated gate means are in their gated position when the piston rods thereof are in their retracted position. Accordingly, it will be noted that the arrangement of the control valves as seen in FIG. 16 is reversed for the two groups of power actuated units as discussed above.

Figure 15:
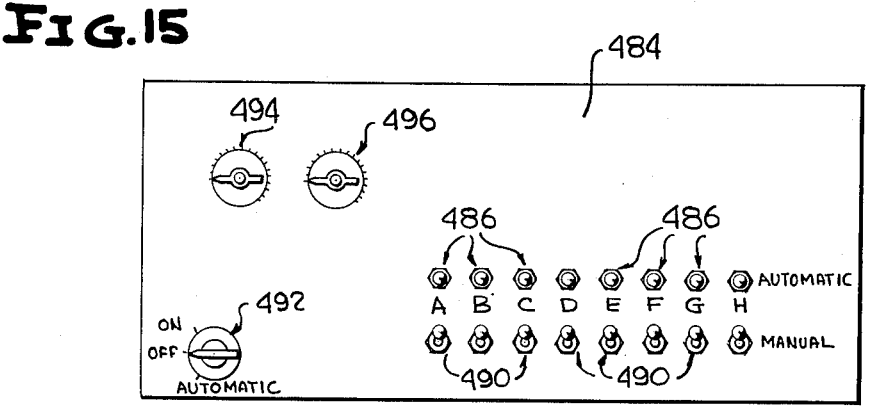
FIG. 15 illustrates the upper portion of the control means and shows the controls associated therewith for operating the apparatus of the present invention.

Referring now particularly to FIGS. 14 and 15 of the drawing, the control means of the present invention is schematically illustrated. As seen in FIG. 14, a control console 480 is provided, a pair of leads 482 connecting the console with any suitable source of electrical energy. As seen in FIG. 15, the control panel 484 of the control console includes eight bulbs indicated generally by reference numerals 486 and identified by the letters A through H inclusive corresponding to the various decks of the unloading mechanism. Immediately below these bulbs are disposed a row of manually operable switches 490 which may be selectively manually operated as desired for causing unloading operation of any particular deck of the unloading mechanism.

A switch 492 is provided for switching the control mechanism on for automatic operation or off. When the switch is moved into the on position, suitable circuitry provided within the control console causes automatic sequential operation of the various decks of the unloading mechanism. This operation is such that the decks may be unloaded in a particular sequence. In a typical example, deck A may be the first deck to be unloaded, whereupon deck B is next, and then deck C and so on through deck H whereupon deck A will again be unloaded in sequence after deck H. This sequence of operation may continue indefinitely. It will of course be understood that the sheet material such as wallboard will continue to arrive upon the various decks of the conveyor mechanism continuously in normal operation of the apparatus, and accordingly, it is necessary to continally operate the unloading mechanism in order to prevent the sheet material from backing up on the conveyor mechanism which may cause damage and improper loading of the sheet material.

When the control mechanism is set for automatic sequential operation, the bulbs A through H will light up in sequence to indicate to an operator the particular deck of the unloading mechanism which is being energized, and accordingly, personnel can readily follow the operation of the unloading mechanism. Should it be desired for any reason to unload the decks in a different sequence or at a different rate of operation, the manual switches 490 may be operated for energizing the individual decks as required.

A first timer mechanism 494 is provided, this mechanism being adjustable for timing the interval during which a particular deck is energized. The control circuitry is such that when a particular deck is energized, the driving motor for the particular deck is energized substantially simultaneously with operation of the solenoid operated valve associated with the gate means of the particular deck. In other words, when the first or uppermost deck A is being unloaded, the driving motor 215 is energized substantially simultaneously with energization of the solenoid of control valve 286'. This will cause the roller members 154, 155, 156 and 157 of deck A to be rotated while at the same time the power actuated unit 286 connected with gate means 260 is operated so as to pivot the gate means into its release position.

The timer mechanism 494 is adapted to control the time during which the particular deck is energized, or in other words, the time during which the driving motor for any particular deck along with the solenoid for the power actuated mechanism associated with the deck is energized. In this manner, the time during which the gate means is open and during which the roller members of the deck are operated may be controlled in accordance with the length of the piece of sheet material which it is desired to unload.

A second timer mechanism 496 is provided, and this timer mechanism is adapted to adjust the time interval between energization of successive decks of the unloading mechanism. In other words, timer mechanism 496 may be adjusted for controlling the time interval after the energization of the driving motor and power actuated means for one deck until the driving motor and power actuated means of the next successive deck is actuated.

As seen particularly in FIG. 14, it will be noted that the control console is operatively connected through the intermediary of cables 238 with all of the driving motors 215 through 222 inclusive, and this control console is further connected through the intermediary of cable 356 with the power actuated mechanisms 286' through 298' inclusive. This diagram is merely for the purpose of illustration, and it will be understood that suitable conventional circuitry is provided for operating the individual components in sequence as aforedescribed.

As seen particularly in FIGS 1, 2 and 5, output feed means is provided for receiving sheet material discharged from the various decks of the unloading mechanism. This output feed means is indicated generally by reference numeral 498 and includes a suitable framework a portion of which is illustrated in FIG. 2 and includes a vertically upstanding frame member 499 and eight sloping frame members 500 which are suitably supported between frame member 499 and another frame member (not shown) spaced therefrom. The frame members 500 are adapted to support a plurality of roller members 502 in suitable pillow block bearings 504. It will be apparent that the roller members 502 are arranged so as to receive sheet material from the various decks of the unloading mechanism. Accordingly, the uppermost series of roller members 502 are adapted to receive sheet material from the uppermost deck of the unloading mechanism. The next series of roller members 502B of the output feed means are adapted to receive sheet material from the roller members of deck B of the unloading mechanism, and so on through the lowermost series of roller members 502H of the output feed means which are adapted to receive sheet material from the lowermost deck H of the unloading mechanism.

As seen most clearly in FIG. 1, the various roller members 502 are disposed in decks each of which are sloped downwardly and forwardly of the apparatus, the roller members 502 terminating adjacent an endless belt 510 which is trained about a plurality of sheaves 512 one of which is visible in FIG. 1. It will be apparent that the arrangement is such that sheet material discharged from the various individual decks of the unloading mechanism will travel downwardly over the roller members 502 of the output feed means and will be finally deposited upon the endless conveyor belt 510 which will carry the sheet material to a suitable transfer table and the like. The roller members 502 may be suitably driven in any desired manner by a conventional driving mechanism. No further details of the output feed means are considered necessary since this type of construction is relatively conventional in the art and forms no part of the present invention.

Considering now particularly FIGS. 12 and 13, the manner in which individual sheets of board material and the like are discharged from the unloading mechanism is illustrated. As seen especially in FIG 12, the gate means 260 is shown in its gated position wherein the flat surface 270 thereof is disposed in substantially vertical relationship. The leading edge of the board 274 is disposed flush against this flat surface 270 and is thereby retained in proper limited aligned relationship on the unloading mechanism. As may be understood from an inspection of FIG. 1, it will be noted that a pair of boards 274 shown in phantom lines are illustrated in side-by-side relationship on the roller members of the uppermost decks of the conveyor mechanism and the unloading mechanism. As seen in FIG. 1, the board 274 nearest to the viewer has arrived at the position shown in FIG. 12 wherein the leading edge of the board is flush against the gate means 260. As shown in FIG. 1, the board remote from the viewer has not yet arrived at this position, and the conveyor roller members will continue to move the board forwardly in the direction of the arrow until it also abuts the gate means 260. In this relationship, the two adjacent boards will be properly aligned and will be substantially parallel with one another.

Turning now to FIG. 13, the gate means 260 is indicated in its release position which permits the board 274 to move forwardly for discharge from the unloading mechanism. During this portion of operation, the roller members of the upper deck of the unloading mechanism are driven by the driving motor connected therewith so as to rapidly move the board 274 in the direction of the arrow.

It will be particularly noted that when the board 274 moves in the direction of feed as shown in FIG. 13, the undersurface of the board is spaced above the gate means 260. In other words, the gate means has pivoted completely out of the path of movement of the board so as to allow free movement thereof in the direction of feed. The board continues to move forwardly until its center of gravity has passed over roller 157 whereupon the board will tilt into the phantom line position shown in FIG. 13 and subsequently be supported by the uppermost row of roller members 502 of the output feed means. The board 274 will then finally be completely supported by the roller members 502 and will travel downwardly thereover until the board comes to rest on the endless conveyor belt 510 previously described.

During normal operation of the apparatus, the sheet material is substantially continuously discharged from the various decks of the drying oven and is received upon the associated decks of the conveyor means. The roller members of the conveyor means are continuously driven by the power driving means 31 so as to move the sheet material forwardly onto the roller members of the associated decks of the unloading mechanism. A gate means of the various decks of the unloading mechanism are normally disposed as seen in FIG. 1 so as to limit movement of sheet material thereover, and when it is desired to discharge the sheet material from the various decks of the unloading mechanism, the control means is operated so as to sequentially energize the driving motors connected with the roller members of the decks of the unloading mechanism in synchronization with the corresponding power actuated means connected with the gate means of the individual decks. The sheet material discharged from the decks of the unloading mechanism is then received upon the various decks of the output feed means and transported to the conveyor belt 510. As mentioned previously, the sequence of operation of the various decks may be varied as well as the time during which the individual decks are energized as well as the time interval between energization of successive decks of the unloading mechanism.

During normal operation of the apparatus, the clutch mechanism will be disengaged such that the driving means 31 of the conveyor mechanism serves to drive all of the roller members 22, 60, 70, 72, and 80. The roller member 90 will not ordinarily be driven under these circumstances due to the overrunning clutch mechanism 96. This arrangement is suitable particularly where the pieces of sheet material are principally supported by the roller members of the various decks of the unloading mechanism. However, on occasion the sheets of material may be considerably longer whereupon it is desired to rotate a certain number of of the roller members of the deck of the conveyor mechanism at the same speed as the roller members of the associated deck of the unloading mechanism. In such case, the clutch mechanism 100 is engaged to thereby cause roller members 70, 72, 80 and 90 of the conveyor mechanism to be rotated at the same speed as the roller members of the unloading mechanism. Drive from the roller members of the deck of the unloading mechanism is effected through clutch mechanism 100, roller member 90, overrunning clutch member 96, and the remainder of the roller members 70, 72, and 80 are positively geared to one another and also connected with the output of the clutch mechanism 96.

The overrunning clutch mechanism 62 enables all of the roller members of the conveyor mechanism downstream of the roller member 60 to overrun the roller members upstream thereof. It is apparent that when it is desired to return to the original mode of operation, it is a simple matter to simply disengage the clutch mechanism 100.

It is apparent from the foregoing that there is provided according to the present invention unloading mechanism for multi-deck conveyor apparatus especially adapted for handling sheet material such as wallboard and the like. The unloading mechanism is specifically designed such that it completely eliminates the necessity of providing rubber pinch rolls which have proved to be unsatisfactory in prior art usage. The arrangement of the present invention, and in particular the aligning gate means assures that the leading edges of side by side pieces of sheet material will be properly aligned with one another and further that the adjacent sheets of material will be disposed substantially parallel with one another so as to cause proper feeding of the sheet material into the output feed means and thence to the discharge portion of the over-all arrangement.

The arrangement of the driving motors associated with each deck of the unloading mechanism in combination with the power actuated means for controlling the operation of the gate means of the associated decks and the manner of synchronization of the operation of the driving motors of the power actuated means ensures smooth and rapid movement of the sheet material from the conveyor mechanism to the output feed means with substantially no damage to the sheet material. The control means of the present invention enables operation of the various decks of the unloading mechanism either automatically or manually in sequence and further enables adjustment of the time intervals during which operation or energization of the driving motors and the power actuated means are effected.

The present invention also provides a novel drive interconnection between the roller members of the conveyor mechanism and the roller members of the unloading mechanism at each deck level which enables certain roller members of the conveyor mechanism decks to be operated either at the same speed as the remaining roller members of the conveyor mechanism deck or at the same speed as the remaining roller members of the conveyor mechanism deck or at the same speed as the roller members of the unloading mechanism of the associated decks.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Unloading mechanism for sheet material including a deck comprising a plurality of substantially parallel roller members extending transverse to the direction of feed of sheet material thereover, said roller members being mounted for rotation, a plurality of roller members of said deck being connected for rotation in unison, driving means for driving said plurality of roller members, aligning gate means mounted adjacent one of said roller members, said aligning gate means being mounted for pivotal movement from a gate position for limiting movement of sheet material over said roller members to a release position permitting free movement of sheet material over said roller members, said gate means when in gated position presenting a flat substantially smooth surface toward said roller members for aligning sheets of material on said roller members, said gate means extending substantially parallel to said roller members and transverse to the direction of feed of sheet material thereover, power operated means for pivoting said gate means into release position, the driving means for said roller members and the power actuated means for said aligning gate means being synchronized so as to be energized simultaneously whereby said roller members are rotated at the same time that said gate means is moved into its release position.

2. Unloading mechanism for multi-deck conveyor apparatus comprising a multi-deck unloading mechanism for sheet material wherein each deck comprises a plurality of substantially parallel and horizontally aligned roller members extending transverse to the direction of feed of sheet material thereover, the roller members of each of said decks being connected for rotation in unison and at substantially the same speed, driving means for each of said decks for rotating the roller members thereof, aligning gate means mounted adjacent the downstream roller member of each of said decks, each of said gate means being mounted for pivotal movement from a gated position limiting movement of sheet material over the roller members to a release position permitting free movement thereover, each of said gate means when in gated position presenting a substantially flat vertical surface facing toward said roller members for aligning a plurality of sheets of material on said roller members, each of said gate means extending substantially parallel with said roller members and transverse to the direction of feed of sheet material thereover, power actuated means for operating each of said aligning gate means and for moving it into its gated and release positions, and means for operating the driving means for each individual deck in synchronization with the aligning gate means of the associated deck so that the roller members of any particular deck are rotated at the same time that the associated gate means is moved into its release position.

3. Apparatus as defined in claim 2 wherein means is provided for operating said decks in sequence, only one of said decks being energized as aforesaid at any particular time.

4. Unloading mechanism for multi-deck conveyor apparatus comprisng a multi-deck unloading mechanism particularly adapted for handling sheet material and wherein each deck of said multi-deck unloading mechanism comprises a plurality of substantially parallel roller members extending transversely of the direction of feed of sheet material thereover, the roller members of each deck being mounted for rotation and being connected for rotation in unison at substantially the same speed, driving means for each individual deck for rotating said roller members of a particular deck, a plurality of aligning gate means, each of said gate means being associated with one of said decks and being located downstream of the roller members of the associated deck, each of said gate means being mounted for movement from a gated position limiting movement of sheet material over the associated roller members to a release position permitting free movement of sheet material over the associated roller members, each of said gate means presenting a substantially flat surface toward said roller members when in gated position to thereby align a plurality of side-by-side pieces of sheet material on said roller members, power actuated means for operating each of said aligning gate means for moving each gate means between its gated position and its release position, and control means operatively connected with said driving means and said power actuated means, said control means being operatively connected such that the roller members of a particular deck are driven simultaneously with movement of the aligning gate means associated with the roller members of said particular deck into its release position whereby sheet material on the roller members of said particular deck may be moved off of said deck and thereby unloaded, said control means being connected so as to operate only one particular deck at a time so that sheet material is unloaded from only one deck at any particular instant.

5. Apparatus as defined in claim 4 wherein each of said gate means is mounted for pivotal movement about a pivot axis which is disposed horizontally below the upper surfaces of the roller members of the associated deck whereby the gate means is adapted to move into a position below the path of movement of sheet material over the roller members of the associated deck such that the gate means in its release position does not come into contact with the sheet material being unloaded from the associated deck.

6. Apparatus as defined in claim 4 wherein said control means includes means for automatically operating the various decks of the unloading mechanism in a particular sequence of operation which repeats itself over and over again.

7. Apparatus as defined in claim 6 wherein said control means includes timer means for controlling the time during which the roller members and the aligning gate means of each particular deck is energized for unloading sheet material from that particular deck, and wherein timer means is provided for varying the interval between the energization of successive decks to perform the unloading mechanism when operating under automatic control.

8. In combination a multi-deck conveyor mechanism, each deck of said conveyor mechanism comprising a plurality of roller members extending substantially parallel with one another and transverse of the direction of feed of sheet material thereover, the roller members of each of said decks being mounted for rotation, driving means for driving the roller members of each of said decks, a multi-deck unloading mechanism including a plurality of decks corresponding to the number of decks of said conveyor mechanism, each of the decks of said unloading mechanism being substantially aligned with one of the decks of said conveyor mechanism, each deck of said unloading mechanism comprising a plurality of substantially parallel roller members extending transverse of the direction of feed of sheet material thereover, all of the roller members of said unloading mechanism being mounted for rotation, driving means for the roller members of each deck of said unloading mechanism, the roller members of each deck of said unloading mechanism being connected for rotation in unison and at substantially the same speed, the driving mechanism associated with the roller members of each deck of the unloading mechanism being adapted to drive the roller members of a particular deck of the unloading mechanism at a speed substantially faster than the speed of rotation of the roller members of the conveyor mechanism deck adjacent thereto, aligning gate means associated with each deck of said unloading mechanism, each of said aligning gate means being mounted downstream of the roller members of a particular deck of said unloading mechanism, each of said gate means being mounted for pivotal movement from a gated position limiting movement of sheet material over the roller members of said unloading mechanism to a release position permitting free movement of sheet material over the roller members, each of said aligning gate means presenting a substantially flat surface toward said roller members so as to align adjacent pieces of sheet material on the associated roller members, each of said gate means extending substantially parallel with said roller members and transverse to the direction of feed of sheet material over said roller members, power actuated means for moving said gate means between its gated position and its release position, and control means for operating said driving means for the roller members of each particular deck and the gate means of the said particular deck such that the roller members of a particular deck are rotated by the associated driving means at the same time that the aligning gate means of this said particular deck is moved into its release position to thereby permit sheet material to be unloaded from said particular deck, only one of said decks being operated at a given time.

9. Apparatus as defined in claim 8 wherein an overrunning clutch mechanism is associated with the driving means for each deck of said conveyor mechanism for providing a driving connection between a downstream roller member of each deck of said conveyor mechanism and the roller members upstream thereof, said overrunning clutch mechanism permitting said downstream roller member of each deck of the conveyor mechanism to drive the roller members upstream thereof, but not transmitting any drive from the driving mechanism associated with the decks of said conveyor mechanism to said downstream roller member of each deck of the conveyor mechanism.

10. Apparatus as defined in claim 9 including clutch mechanism for selectively connecting the said downstream roller member of each deck of said conveyor mechanism with the roller members of the associated deck of the unloading mechanism whereby the driving means associated with the roller members of a particular deck of said unloading mechanism is adapted to drive the roller members of the associated deck of the conveyor mechanism.

11. Apparatus as defined in claim 10 wherein said last-mentioned clutch mechanism comprises a selectively engageable positive clutch.

12. In combination, a multi-deck conveyor mechanism for receiving sheet material, said conveyor mechanism including a plurality of decks, each of said decks comprising a plurality of roller members extending substantially parallel with one another and being spaced from one another and substantially horizontally aligned with one another, said roller members being mounted for rotation and extending transversely to the direction of feed of sheet material thereover, power driving means for driving the roller members of each deck of said conveyor mechanism, first overrunning clutch driving means providing a driving connection between certain roller members of each deck of said conveyor mechanism and certain other roller members downstream of each deck of said conveyor mechanism, second overrunning clutch mechanism providing a driving connection between a downstream roller member of each deck and the roller members upstream thereof, said second overrunning clutch mechanism permitting said downstream roller member to drive the roller members upstream thereof in a particular deck but preventing a driving connection in the reverse direction, a multi-deck unloading mechanism comprising a plurality of decks each of which is aligned with one of the decks of said conveyor mechanism, each deck of said unloading mechanism comprising a plurality of substantially parallel and horizontally aligned roller members mounted for rotation and extending transversely of the direction of feed of sheet material thereover, the roller members of each deck of said unloading mechanism being interconnected for rotation in unison and at substantially the same speed, separate driving means operatively connected with the roller members of each deck of said unloading mechanism for driving the roller members of a particular deck of the unloading mechanism at a substantially greater speed of rotation than the speed of rotation of the roller members of the associated deck of the conveyor mechanism, clutch means for selectively providing a driving connection between the roller members of each deck of said unloading mechanism and the said downstream roller of the associated deck of the conveyor mechanism, a plurality of aligning gate means, each of said gate means being mounted for pivotal movement from a gated position limiting movement of sheet material over the roller members of the associated deck to a release position permitting free movement of sheet material over the associated roller members, each of said gate means presenting a substantially flat vertical surface when in its gated position to align side by side sheets of material on the associated roller members, each of said gate means being mounted for pivotal movement about a pivotal axis such that the gate means in its release position is completely out of the path of movement of sheet material over the roller members of the associated deck, power actuated means operatively connected with each of said gate means for moving the gate means between its gated position and its release position, and control means operatively connected with the driving means for the roller members of each deck of the unloading mechanism and also being operatively connected with the power actuated means for operating the gate means of each deck of the unloading mechanism such that the roller members of a particular deck of the unloading mechanism are rotated by the associated driving means simultaneously with movement of the gate means of the associated deck of the unloading mechanism to its release position, and further the driving means is de-energized so as to stop rotating the roller members of a particular deck of the unloading mechanism simultaneous with movement of the aligning gate means back to its gated position.

13. Apparatus as defined in claim 12 wherein said control means includes means for automatically operating the various decks of the unloading mechanism in a particular sequence, and further wherein said sequence is automatically repeated.

14. Apparatus as defined in claim 13 including means for manually and selectively controlling the sequence of operation of the various decks of the unloading mechanism.

15. Apparatus as defined in claim 13 wherein said control means includes timer means for controlling the time of energization of the driving means for the roller members and co-actuating means for the gate means of each individual deck of the unloading mechanism, and further timer means for controlling the time interval between the energization of different decks of the unloading mechanism.

16. Apparatus as defined in claim 12 including an off-bearing conveyor means, and output feed means interposed between said unloading mechanism and said off-bearing conveyor means, said output feed means including a plurality of decks for receiving sheet material from the various decks of the unloading mechanism, the decks of the output feed means converging to feed all of the sheet material received thereby onto said off-bearing conveyor means.

References Cited by the Examiner
UNITED STATES PATENTS
3,011,619  12/1961  Fields _____ 198—20

SAMUEL F. COLEMAN, *Primary Examiner.*

WILLIAM B. LABORDE, *Examiner.*

R. E. KRISHER, *Assistant Examiner.*